United States Patent [19]

Guzowski et al.

[11] Patent Number: 4,834,398

[45] Date of Patent: May 30, 1989

[54] PIPE GASKET

[75] Inventors: Samuel Guzowski, San Jose, Costa Rica; Leo Parth, Fort Worth, Tex.

[73] Assignee: S & B Technical Products, Inc., Dallas, Tex.

[21] Appl. No.: 91,586

[22] Filed: Aug. 31, 1987

[51] Int. Cl.$^4$ .................... F16J 15/10; F16L 19/07
[52] U.S. Cl. .................... 277/207 A; 285/110; 285/345; 285/379
[58] Field of Search .............. 277/152, 207 A, 227, 277/228, 188 A; 285/110, 230–232, 345, 379

[56] References Cited

U.S. PATENT DOCUMENTS

| | | | |
|---|---|---|---|
| 2,386,873 | 8/1943 | Mercier | 286/26 |
| 3,469,854 | 9/1969 | Linwood | 277/144 |
| 4,030,872 | 6/1977 | Parmann | 425/393 |
| 4,128,251 | 12/1978 | Gaither et al. | 277/233 |
| 4,343,480 | 8/1982 | Vassallo | 277/207 A |
| 4,379,559 | 4/1983 | Bohman | 277/207 A |
| 4,468,042 | 8/1984 | Pippert et al. | 277/188 |
| 4,572,523 | 2/1986 | Guettouche et al. | 285/231 X |
| 4,602,793 | 7/1986 | Andrick | 277/152 X |
| 4,625,383 | 12/1986 | Vassallo et al. | 277/207 A X |
| 4,637,618 | 1/1987 | Valls | 277/207 A X |
| 4,693,483 | 9/1987 | Valls | 285/231 X |

Primary Examiner—David Werner
Attorney, Agent, or Firm—Charles D. Gunter, Jr.

[57] ABSTRACT

A pipe gasket is shown for use in forming a joint made up of an outer pipe having an annular groove therein for receiving the gasket and an inner pipe inserted within the outer pipe. The gasket includes a body formed from a resilient material having an interior and an exterior. The interior of the body includes a first portion formed of a hard, relatively high durometer material which is initially contacted by the inner pipe and a second portion formed of a relatively lower durometer, more flexible material. The second portion includes an inwardly extending projection which forms a primary sealing surface with respect to the inner pipe when the inner and outer pipes are assembled. Because the entry region initially contacted by the inner pipe is formed of a higher durometer material, the gasket tends to securely maintain its position within the outer pipe groove during the installation of the inner pipe.

3 Claims, 2 Drawing Sheets

PIPE GASKET

BACKGROUND OF THE INVENTION

1. Field of the Invention

The present invention relates generally to sealing devices for pipes and specifically to a sealing gasket for sealing off a joint between a socket end and an insert end of two cooperating pipes.

2. Description of the Prior Art

The pipe gaskets of the present invention are especially intended for use in water pipes. In joining such pipes, especially formed from plastic material, it is often preferred to position the sealing gasket for sealing the pipe joint in a groove provided in the outer pipe at the manufacturing site. However, it has been difficult to provide pre-installed gaskets which were securely retained in the outer pipe groove during transport and handling of the pipes. The problem of retaining the sealing gaskets during the joining of such pipes is further complicated where the outer pipe groove has a bottom surface which is at least partly of a rounded shape, rather than being square or rectangular in an cross-sectional area. In the case of grooves having a partly rounded bottom surface, insertion of the inner pipe within the mouth of the outer pipe tend to twist or dislodge the sealing gasket so that the gasket fails to perform the intended sealing function.

U.S. Pat. No. 4,379,559, issued Apr. 12, 1983, entitled "PIPE SEALING DEVICE" to Bohman, shows a sealing device utilizing a retainer ring or band made of a rigid material which cooperates with a sealing ring formed from a more resilient material. The retainer ring is received within a groove in the sealing ring and helps to maintain the position of the sealing device in the outer pipe groove during installation of the inner pipe.

The present invention has as its objective the provision of a seal gasket which is of unitary design and which eliminates the need for a separate retaining ring.

Another object of the invention is the provision of a sealing gasket formed from a unique combination of materials and having a specialized geometry which insures that the gasket will be retained within the outer pipe groove during installation of the inner pipe in forming a water tight pipe joint.

Additional objects, features and advantage will be apparent in the written description which follows.

SUMMARY OF THE INVENTION

A pipe gasket of the invention is used in forming a pipe joint having a central longitudinal axis, the pipe joint being made up of an outer pipe having an annular groove therein for receiving the gasket and an inner pipe inserted within the outer pipe. The gasket includes a body formed from a resilient material, the body having an interior and an exterior. The interior of the body has a tapered entry surface which joins an integrally formed band region. The band region has a constant internal diameter with respect to the central longitudinal axis of the pipe joint. The interior also has a radially inwardly extending projection which includes an annular conical sealing surface which provides an elongated deformation length and serves as a sealing area with respect to the inner pipe when the inner and outer pipes are assembled.

The tapered entry surface and integrally formed band region are formed as relatively rigid, high durometer material. The remainder of the body is formed as a lower durometer, relatively resilient material whereby the entry region and band region are resistant to deformation so that the gasket is securely maintained in the outer pipe groove during installation of the inner pipe.

DESCRIPTION OF THE PREFERRED EMBODIMENT

The gasket of the invention is especially intended to be used in connection with water pipes manufactured from plastic and formed with standardized internal grooves for receiving the gaskets. Pipes of this type are typically used in outdoor installations such as water and sewer pipes and the standardization of the pipes and the grooves therein results in the shape and dimensions of the grooves being predetermined and not subject to being changed.

Figure 1:
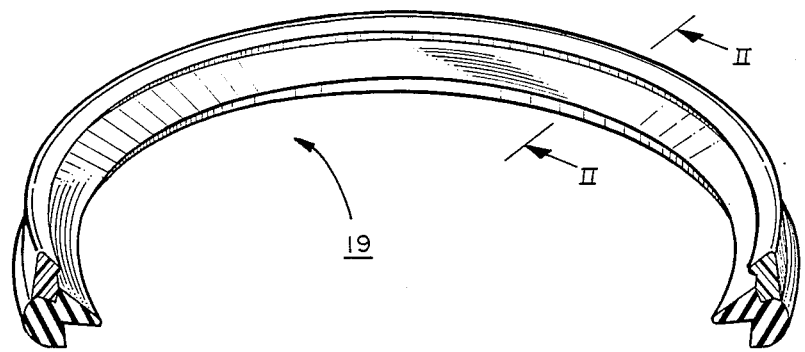
FIG. 1 is a perspective view, partly broken away, of the sealing gasket of the invention.
Figure 2:
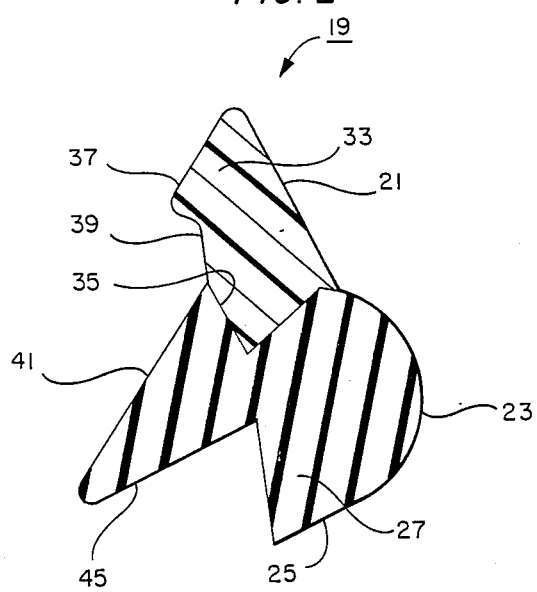
FIG. 2 is a side, cross-sectional view of the sealing ring of FIG. 1 taken along lines II—II.
Figure 3:
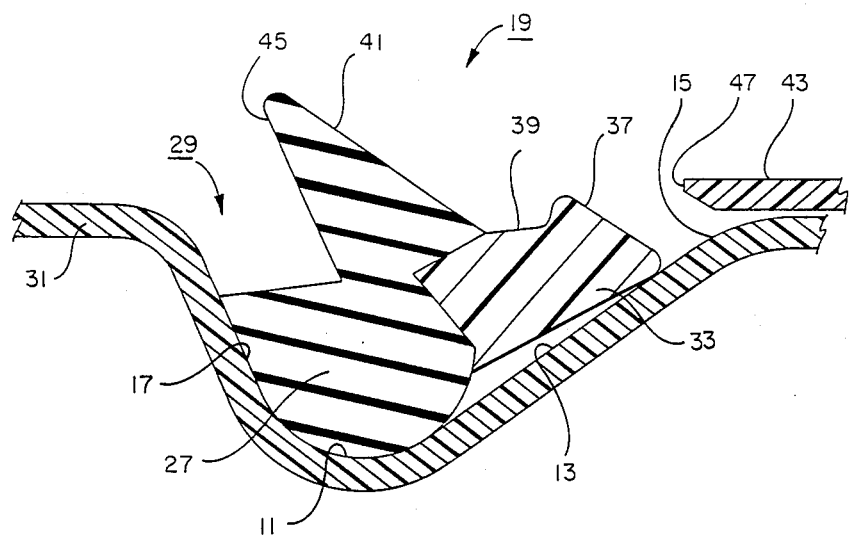
FIG. 3 is a side, cross-sectional view of the gasket of the invention in place within the annular groove of the outer pipe.

FIG. 3 shows, in cross-section, a typical groove of the type used for receiving the gasket of the invention. The groove has a bottom surface 11, the section of which is defined by a substantial arc and a substantially straight portion 13 which faces the opening of the pipe 15. As can be seen, the groove widens from the opening of the pipe, having the greatest internal diameter at the bottom surface 11, the bottom surface 11, in turn, terminating in a relatively obtuse conical converging portion 17. As best shown in FIG. 2, the shape of the groove dictates that the gasket 19 must have an outer surface the section of which is defined by a straight portion 21 which is inclined in relation to the axis of the pipe, an arc shaped portion 23 which terminates in a conically converging inclined portion 25. The surface portions 21, 23 and 25 define between themselves and radially inside therefrom a body which is received within the annular groove (29 in FIG. 3) formed in the outer pipe 31 adjacent the mouth opening 15 thereof.

As shown in FIG. 2, the body is integrally formed as a unitary member from a first portion 27 of a resilient, moisture proof material, such as a relatively low durometer natural or synthetic rubber to provide efficient sealing against the outer pipe groove 29. The body also includes a second portion 33 formed of a harder, less resilient material which has a higher durometer than the material of the first portion 27. Suitable materials for the second portion 33 include hard plastic materials, such as polypropylene plastic or polyvinyl chloride plastic or relatively higher durometer rubber. In the preferred embodiment the second portion 33 is formed from rubber having a Shore A durometer on the order of 75 to 95 and the first portion 27 is formed from rubber having a Shore A durometer on the order of 40 to 65. In this discussion, the term "integrally formed" body portions is intended to mean that the portions 27, 33 are bonded or otherwise joined along an angular boundary 35. The portions 27, 33 could be produced, for example, by extrusion, the portions 27, 33 being joined by gluing or vulcanization to form the unitary gasket 19. Those skilled in the rubber fabrication art will also recognize that available techniques can be utilized in forming a unitary body having regions of differing durometer. It is important to note that a separate retainer ring or band of rigid material is not utilized.

As shown in FIG. 2 the gasket body has an interior which includes a tapered entry surface 37 which joins an integrally formed band region 39. The band region 39 circumscribes the central longitudinal axis of the pipe joint and has a constant internal diameter with respect to the central longitudinal axis of the pipe joint. By central longitudinal axis is meant an imaginary line which passes through the center of the pipe bore along the length of the pipe.

The interior of the gasket body also has an inwardly extending projection 41 which includes an annular conical sealing surface which provides an elongated deformation length and serves as a sealing area with respect to the inner pipe (43 in FIG. 4) when the inner and outer pipes are assembled. The inwardly extending projection 41 has a rear face 45 which forms and acute angle with respect to the remainder of the first portion 27.

The method of forming a pipe joint utilizing the gasket of the invention will now be described. With reference to FIG. 3, it will be appreciated that as an inner pipe 43 is introduced into the mouth of the outer pipe 31, the gasket 19 will be deformed with radial components of force being exerted on the gasket. The radial components of force will be transferred substantially to that portion of the groove defined by the conical converging portion 17 which tends to result in a twisting movement on the gasket in the counterclockwise direction as the gasket is viewed in FIG. 3. If the gasket were uniformly resilient, the right end of the gasket as viewed in FIG. 3 would be raised from the pipe groove so that the gasket would fail to maintain its intended position after the introduction of the inner pipe 43.

Because Applicants' gasket has a tapered entry surface 37 and band region 39 formed from a relatively higher durometer, less resilient material, the portion 33 resists the tendency to twist and maintains the position of the gasket within the groove.

Figure 4:
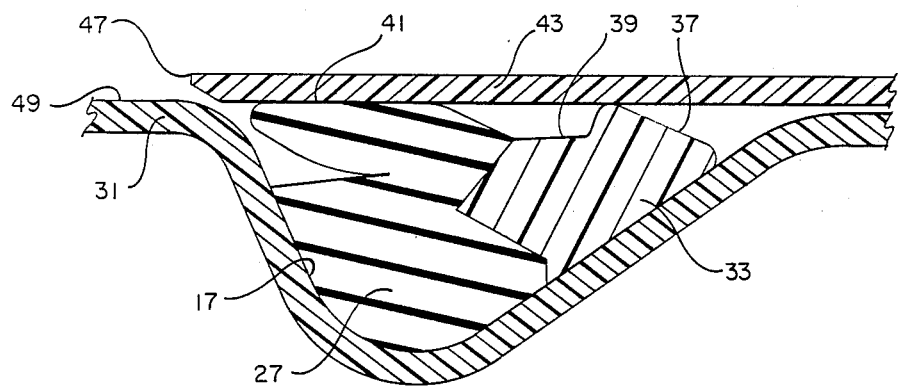
FIG. 4 is a side, cross-sectional view similar to FIG. 3 showing the installation of the inner pipe within the mouth of the outer to form the pipe joint of the invention.

As the introduction of the inner pipe 43 is continued, the end 47 thereof contacts the inwardly extending projection 41 of the portion 27. Because the projection 41 and portion 27 are formed of a lower durometer, more elastic or resilient material, the projection 41 is deformed as shown in FIG. 4. As a result, the sealing portion is folded inwardly in the direction of the remaining bore 49 of the outer pipe 31. As shown in FIG. 4, the sealing portion now contacts the remaining portion 27 of the body, thereby exerting a radial force upon the inclined portion 27 of the groove. However, the gasket is not twisted or dislodged because of the relatively rigid or inelastic nature of the second portion 33.

An invention has been provided with several advantages. The gasket design of the invention is relatively simple to manufacture and inexpensive to produce. The gasket provides a superior seal, especially in thermoplastic pipe joints, and resists twisting or bunching during the installation of the inner pipe within the mouth of the outer pipe to form the pipe joint. Because of its unitary design, the need for a separate rigid retainer ring is eliminated. The design is well suited for installation within a pipe groove at the manufacturing plant and can be transported and assembled at distant locations without being dislodged.

While the invention is shown in only one of its forms, it is not thus limited but is subject to various changes and modifications without departing from the spirit thereof.

I claim:

1. A pipe gasket adapted for use in forming a pipe joint having a central longitudinal axis, the pipe joint being made up of an outer pipe having an annular groove adjacent a mouth opening thereof for receiving the gasket and an inner pipe inserted within the outer pipe, the gasket comprising:

a unitary body having a first portion formed of relatively low durometer rubber to provide sealing against the outer pipe groove and having a second portion of a harder, less resilient plastic material, the second portion having a tapered entry surface on an interior surface thereof which joins an integrally formed band region, wherein the band region circumscribes the central longitudinal axis of the pipe and has a constant internal diameter with respect to the central longitudinal axis, the first portion of said unitary body also having an inwardly extending projection which extends directly from the constant internal diameter of said band region to define an annular conical sealing surface for said unitary body, said annular conical sealing surface providing an elongated deformation length which serves as a sealing area with respect to the inner pipe when the inner and outer pipes are assembled;

wherein the less resilient, second portion of the unitary body has an exterior defined by a straight portion, when viewed in section, which is inclined in relation to the longitudinal axis of the pipe and which is adapted to directly contact the annular pipe groove adjacent the mouth opening thereof, the remainder of the exterior of the unitary body being comprised of said low durometer first portion which occupies the remainder of the annular pipe groove; and the harder, less resilient entry surface and band region being resistant to deformation so that the unitary body is securely maintained in the groove of the outer pipe during installation of the inner pipe.

2. The pipe gasket of claim 1, wherein the first and second portions of said unitary body are joined together along an angular boundary which forms a V-shaped internal profile within said unitary body.

3. The pipe gasket of claim 1, wherein said tapered entry surface on the interior of said second portion terminates in a protruding nub at the juncture with said integrally formed band region.

* * * * *